(12) United States Patent
Bove et al.

(10) Patent No.: US 6,679,604 B1
(45) Date of Patent: Jan. 20, 2004

(54) SPECTACLES WITH A PIVOTABLE AND TRANSLATABLE TEMPLE ARM

(76) Inventors: Nelson David Bove, 4560 Walton Creek, Cincinatti, OH (US) 45243; Steven Benjamin Walmsley, 3151 Lindenwood La., Fairfax, VA (US) 22031

( * ) Notice: Subject to any disclaimer, the term of this patent is extended or adjusted under 35 U.S.C. 154(b) by 0 days.

(21) Appl. No.: 10/219,259

(22) Filed: Aug. 16, 2002

(51) Int. Cl.$^7$ ................................................ G02C 5/22
(52) U.S. Cl. ........................................ 351/153; 16/228
(58) Field of Search ...................... 381/153, 41; 16/228

(56) References Cited

U.S. PATENT DOCUMENTS

| | | |
|---|---|---|
| 1,779,015 A | 10/1930 | Schmitt |
| 2,097,371 A | 10/1937 | Hon |
| 2,608,905 A | 9/1952 | Nelson |
| 3,210,814 A | 10/1965 | Wolf |
| 3,899,840 A | 8/1975 | Maillet |
| 4,153,347 A | 5/1979 | Myer |
| 4,488,792 A | 12/1984 | Wagner |
| 4,496,224 A | 1/1985 | Allen |
| 5,035,499 A | 7/1991 | Kitamura et al. |
| 5,351,098 A | 9/1994 | McDaniels et al. |
| 5,426,473 A | * 6/1995 | Riehm ........................ 351/121 |
| 5,963,296 A | 10/1999 | Matera |
| 5,987,702 A | 11/1999 | Simioni |
| 6,017,120 A | 1/2000 | McCormick |
| 6,033,069 A | 3/2000 | Lee |
| 6,059,410 A | 5/2000 | Wang |
| 6,196,682 B1 | 3/2001 | Walmsley et al. |
| 6,210,003 B1 | 4/2001 | Chan |
| 6,343,859 B1 | 2/2002 | McCormick |

* cited by examiner

Primary Examiner—Hung Xuan Dang

(57) ABSTRACT

Spectacles having a lens frame and a temple arm attached to the lens frame. Means are provided for pivotably and translatably mounting the temple arm to the lens frame such that the temple arm and lens frame are relatively pivotable with respect to one another and the temple arm and lens frame are relatively translatable with respect to one another.

19 Claims, 2 Drawing Sheets

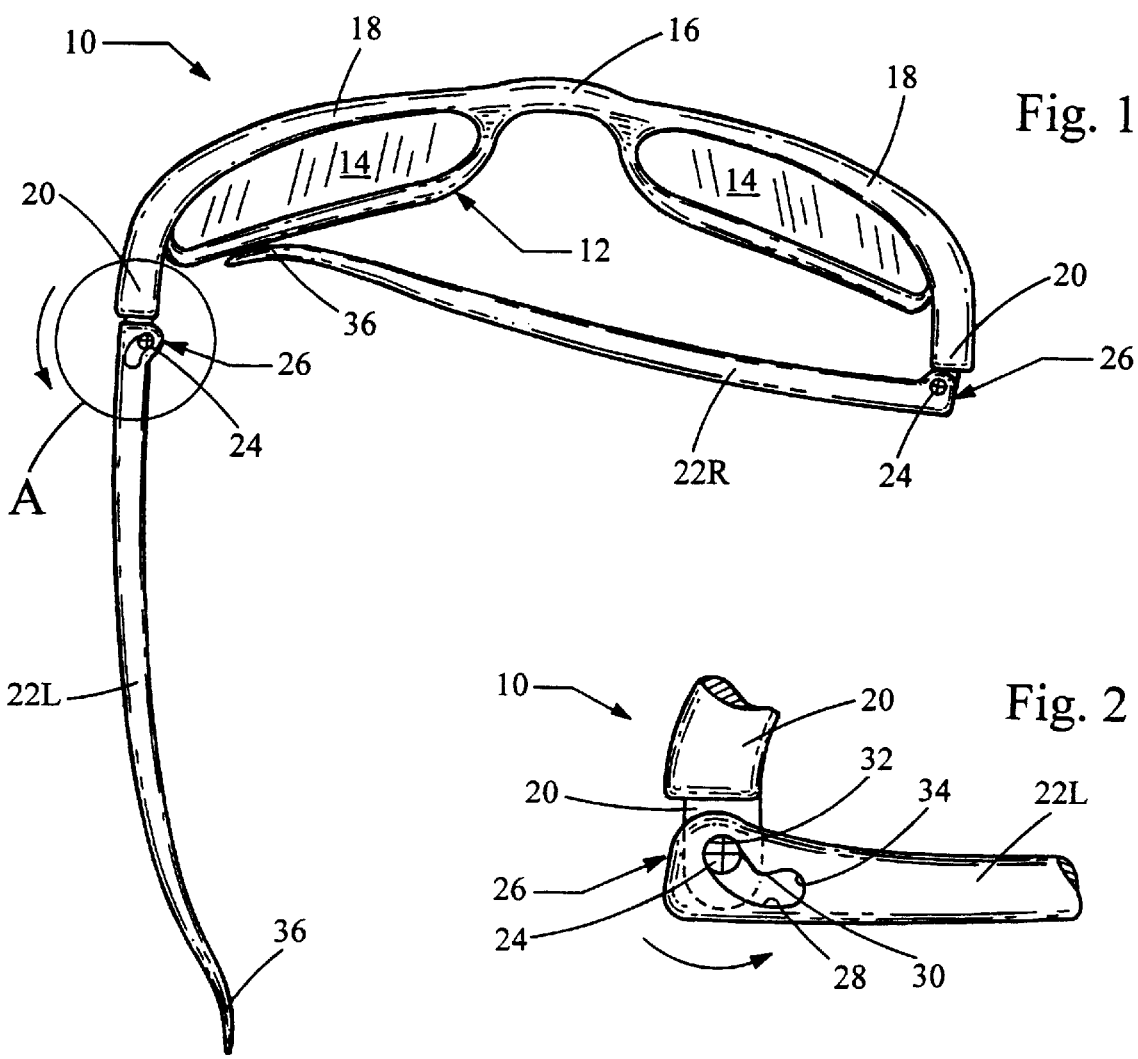
Fig. 1
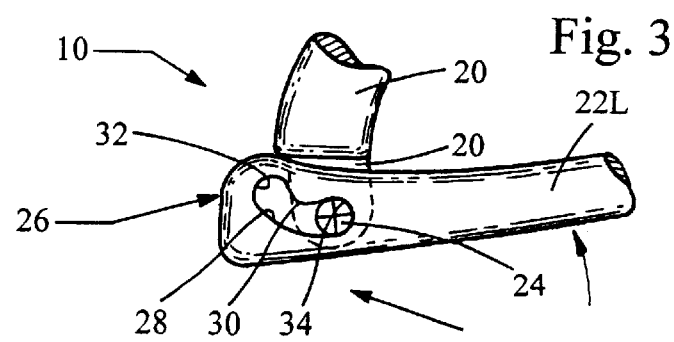
Fig. 2
Fig. 3

SPECTACLES WITH A PIVOTABLE AND TRANSLATABLE TEMPLE ARM

BACKGROUND

The present invention relates generally to eyewear and more particularly to spectacles hinge design. Spectacles typically include a frame having two rims, each holding a lens, and further include two temple arms, each on opposite lateral sides of the frame and attached by a respective hinge. The hinge enables the wearer to pivot the temple arms from an open position, as worn on the face, to a closed position against the frame for storing. Unfortunately, however, conventional eyewear design provides no means for clipping spectacles to an article or surface for storage or safekeeping. Some unconventional eyewear designs have attempted to incorporate additional components on temple members of the spectacles to enable clipping the spectacles to another item. Due to the additional pieces of hardware required, such designs can be prohibitively bulky, complex, expensive, and unattractive.

BRIEF SUMMARY OF THE INVENTION

An embodiment of the present invention includes spectacles having a lens frame and a temple arm attached to the lens frame. Means are provided for pivotably and translatably mounting the temple arm to the lens frame. Thus, the temple arm and lens frame are relatively pivotable with respect to one another and the temple arm and lens frame are relatively translatable with respect to one another.

BRIEF DESCRIPTION OF THE SEVERAL VIEWS OF THE DRAWINGS

Features and advantages of the present invention will become apparent to those skilled in the art from the following description with reference to the drawings, in which:

FIG. 1 is a top view of spectacles according to an embodiment of the present invention, wherein a left temple member is in a substantially open position and a right temple member is in a substantially closed position with respect to a lens frame;

FIG. 2 is an enlarged top view of a portion of the spectacles of FIG. 1 denoted by circle A thereof, wherein the left temple member has been pivoted toward a substantially closed position with respect to the lens frame;

FIG. 3 is a top view of the spectacles of FIG. 2, wherein the left temple member has further been translated in an outboard direction with respect to the lens frame;

DETAILED DESCRIPTION OF THE INVENTION

Figure 4:
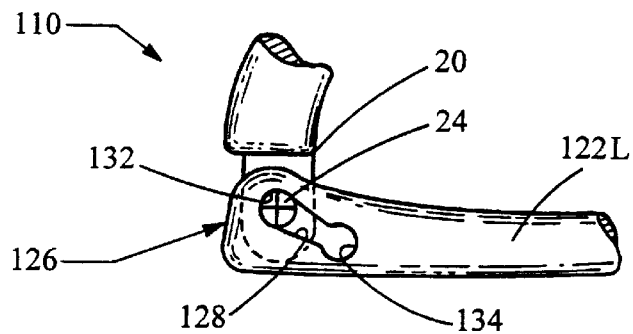
FIG. 4 is a top view of the spectacles of FIG. 5, wherein the left temple member occupies a pivotable position with respect to the lens frame.

The present invention is not limited in its application to the details of any particular arrangement described or shown, since the present invention is capable of multitudes of embodiments without departing from the spirit and scope of the present invention. First, the principles of the present invention are described by referring to only a couple of exemplary embodiments for simplicity and illustrative purposes. Although only a limited number of embodiments of the invention are particularly disclosed herein, one of ordinary skill in the art would readily recognize that the same principles are equally applicable to, and can be implemented in all types of spectacles. Furthermore, numerous specific details are set forth to convey with reasonable clarity the inventors' possession of the present invention, how to make and use the present invention, and the best mode in carrying out the present invention known to the inventors at the time of application. It will, however, be apparent to one of ordinary skill in the art that the present invention may be practiced without limitation to these specific details. In other instances, well known methods and structures have not been described in detail so as not to unnecessarily obscure the present invention. Finally, the terminology used herein is for the purpose of description and not of limitation. Thus, the following detailed description is not to be taken in a limiting sense and the scope of the present invention is defined by the claims and their equivalents.

In general, the present invention involves eyewear or spectacles including a lens frame and at least one temple arm that is pivotably mounted to the lens frame. More specifically, the present invention involves spectacles where a temple arm and lens frame thereof can be firmly clasped or compressed relatively against one another so as to bias the temple arm tightly against the lens frame in a closed and biased position for pinching something between the temple arm and lens frame. While the present invention may be described in detail with respect to a single temple arm that is biased against a lens frame, the present invention is also well suited to both temple arms being biased against the lens frame so that the present invention may be used in an ambidextrous manner.

As used herein, the term "lens frame" encompasses spectacles having a full frame, a partial frame, lenses that double as the lenses and frame structure, etc. Likewise, the term "temple arm" encompasses spectacles having separately attached temple arms, integral temple arms, and any conceivable structure that fulfills the purpose of temple arms. As used herein, the term "bias" is intended to mean to urge, force, load, etc. For example, the temple arm is biased toward the lens frame such that a separation force must be exerted to separate the temple arm away from the lens frame when the temple arm is in a closed and locked position. Further, the temple arm resiliently recovers the closed and locked position—biased against the lens frame—upon release of the separation force. Thus, the temple arm is under a stored load in the closed and locked position. Furthermore, the phrase " . . . temple arm biased against the lens frame . . . ", or any reasonably similar equivalent, equivalently encompasses the temple arm being directly biased against the lens frame, indirectly biased against the lens frame through another temple arm intermediate the lens frame and temple arm, and biased against the lenses of the spectacles. In addition, the term "tightly" is intended to mean involving a bias force at least tight enough to pinch and maintain position as clipped to something under the weight of the spectacles. Accordingly, the spectacles—if turned upside down—would fall off the storage surface without the bias force. The terms "mounted", "attached", etc. basically mean that one thing is connected to another in some fashion. Finally, the term "clasp" is used synonymously with embrace, grip, grasp, hold, or clutch and refers to a releasable mechanism for holding two or more objects together.

Referring now specifically to the Figures, FIG. 1 illustrates a perspective view of an eyewear assembly or spectacles 10 having a rim frame or lens frame 12 housing a pair of lenses 14. The exemplary lens frame shown includes a nose bridge 16 spanning adjacently disposed brow portions 18. The brow portions 18 of the lens frame 12 extend in generally opposite outboard directions away from the nose bridge 16. The brow portions 18 terminate in the form of oppositely disposed shoulders 20 of the lens frame 12. Each shoulder 32 is preferably integral with the rest of the lens frame 12 but may be welded, fastened, adhered, or otherwise separately attached in any manner thereto.

Attached to the shoulders 20 of the lens frame 12 are a left or first temple arm 22L and a right or second temple arm 22R on opposite outboard sides of the spectacles 10 via a hinge pivot 24 through a pivot end 26 on each of the left and right temple arms 22L and 22R. The exemplary spectacles 10 shown herein use a hinge screw for the hinge pivot 24, but the term "hinge pivot" encompasses a simple screw, pin, projection, or any conceivable structure that fulfills the purpose of pivotably attaching a temple arm to a lens frame. In other words, an independent, separate hinge pin or device need not be used to carry out the invention. Each hinge pivot 24 attaches the temple arms 22L and 22R to the lens frame 12 in a pivotable manner. Furthermore, the hinge pivot 24 is preferably a smoothly finished metal eyewear screw, but can be composed of any other materials. Again, any other structure for pivotably attaching the temple arms 22L and 22R to the lens frame 12 may be used without departing from the intended scope of the present invention.

One of the respective hinge pivots 24 extends through the shoulder 20, about which is pivotably mounted the pivot end 26 of temple arm 22L. In other words, the hinge pivot 24 extends through the shoulder 20 and pivotably attaches the temple arm 22L to the lens frame 12. As shown, the left temple arm 22L occupies a substantially open position that is substantially perpendicular with respect to the lens frame 12, while the right temple arm 22R occupies a substantially closed position that is substantially parallel with respect to the lens frame 12. When both the left and right temple arms 22L and 22R occupy open positions, the spectacles 10 are ready to be placed on the head of a wearer.

Referring now to FIG. 2, there is shown in an enlarged view, the left temple member 22L as swung or pivoted from the substantially open position of FIG. 1 to a substantially closed position. The pivot end 26 of the temple arm 22L includes void or aperture 28 therethrough that engages the hinge pivot 24 as shown. Thus the hinge pivot 24 extends through the aperture 28 of the pivot end 26 of the temple arm 22L and into the shoulder 20 of the lens frame 12. Preferably, the pivot end 26 of the temple arm 22L is double flanged so that it bears upon the shoulder 20 from above and below such that it sandwiches the shoulder 20. In other words, from an end view, the pivot ends 26 of the temple arms 22L and 22R would be C-shaped. The aperture 28 in this embodiment is preferably a slot that is elongated and arc shaped with a detent forming projection 30 of the temple arm 22L that projects into the aperture 28. The aperture 28 is further defined by one end or a pivot end 32, and by an opposite or lock end 34. In FIGS. 1 and 2, the pivot end 32 of the aperture 28 is aligned with the hinge pivot 24 to permit pivoting of the temple arm 22L with respect to the lens frame 12. The pivot end 32 of the aperture 28 is sized with respect to the size of the hinge pivot 24 so as to permit relatively free pivotable movement therewith. As shown in FIG. 2, the temple arm 22L is now ready to be relatively translated with respect to the lens frame 12.

Referring now to FIG. 3, the temple arm 22L has been translated with respect to the lens frame 12 in a generally outboard direction. The temple arm 22L has been urged in an outboard direction so as to relatively displace the hinge pivot 24 beyond the projection 30 and into the detent position at the opposite end or lock end 34 of the aperture 28. Accordingly, the temple arm 22L is biased toward the lens frame 12 under a detent condition at the pivot end 26 of the temple arm 22L.

In this position and as shown, a portion of the pivot end 26 of the temple arm 22L is jammed against a portion of the shoulder 20. In other words, a portion of the pivot end 26 of the temple arm 22L is frictionally caught between a portion of the shoulder 20 and the hinge pivot 24. Also, a portion of an oppositely disposed ear end (not shown) of the temple arm is biased toward and/or against a portion of the lens frame 12. Again, the ear end may be biased directly against the lens frame 12, or indirectly against the lens frame 12 through the other temple arm 22R. The lock end 34 of the aperture 28 can either be sized to frictionally grip the hinge pivot 24 or relatively freely engage the hinge pivot 24, just as long as the projection 30 establishes a detent for the hinge pivot 24, so that the temple arm 22L remains in place until forcibly translated from the detent position to an out of detent position.

Similar to FIG. 2, FIG. 4 illustrates another embodiment of the spectacles 110 of the present invention. Here, however, an aperture 128 in a pivot end 126 of a temple arm 122L is not arcuately shaped and does not include a detent forming projection. Instead, the aperture 128 includes a pivot end 132 for freely engaging the hinge pivot as described with respect to FIG. 2. Disposed substantially oppositely of the pivot end 132 of the aperture 128 is a lock end 134 of the aperture 128. The aperture 128 intentionally narrows or reduces in size from the pivot end 132 to the lock end 134. As illustrated, the lock end 134 is sized so as to frictionally engage the hinge pivot 24 and retain the hinge pivot 24 in a detent condition.

Figure 5:
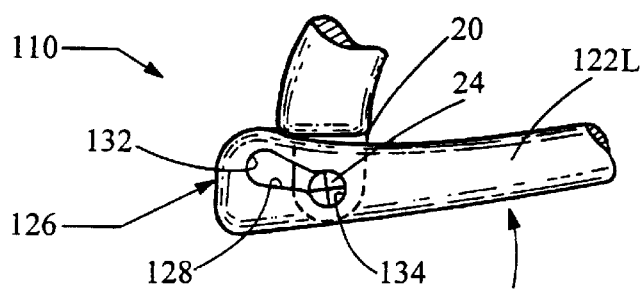
FIG. 5 is an enlarged top view of a portion of the spectacles of FIG. 6 denoted by circle B thereof, wherein the left temple member has been translated in an outboard direction with respect to the lens frame into a locked position.

Thus, as shown in FIG. 5, when the temple arm 122L is translated in an outboard direction with respect to the shoulder 20 of the lens frame 12, the hinge pivot 24 snaps into detent in the lock end 134 of the aperture 128 in the pivot end 126 of the temple arm 122L. In this position a portion of the pivot end 126 of the temple arm 122L is jammed against a portion of the shoulder 20 while a portion of an oppositely disposed ear end 136 of the temple arm 122L is biased toward and/or against a portion of the lens frame 12, as shown in FIG. 6.

Figure 6:
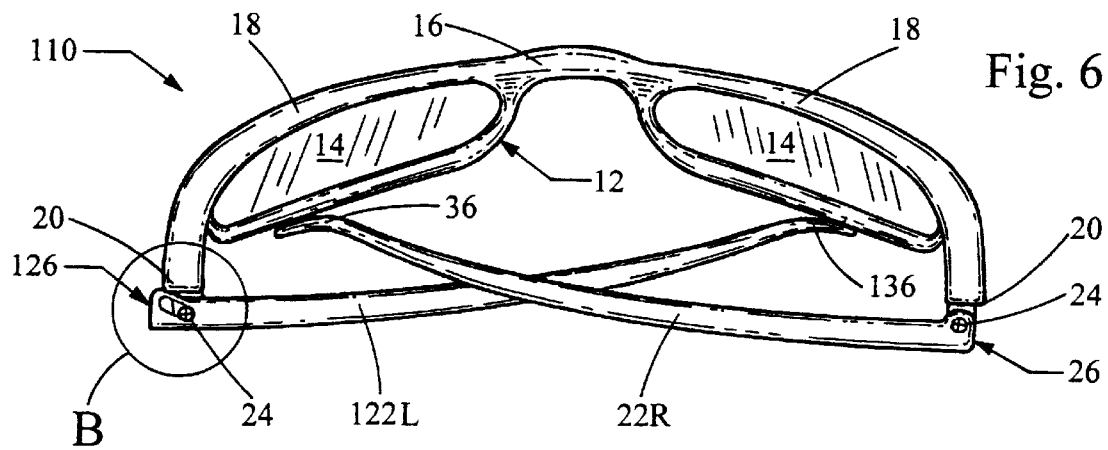
FIG. 6 is a top view of spectacles according to another embodiment of the present invention, wherein a left temple member is in a substantially closed and locked position and is biased against a lens frame, and a right temple member is also in a substantially closed position with respect to the lens frame.

Referring to FIG. 6, temple arm 122L is shown in a closed and locked position substantially parallel with respect to the lens frame 12 and biased against the lens frame 12. In addition, the right temple arm 22R is shown in a closed position substantially parallel to the lens frame 30. The right temple arm 22R may also be biased against the lens frame 12 in circumstances where temple arm 122L is indirectly biased against the lens frame 12 through temple arm 22R. When one or both temple arms occupy a closed position substantially parallel with respect to the lens frame 12, the spectacles 10 are ready for storage. The temple arms 122L and 22R are pivotable to and from the substantially open and closed positions inclusive. For example, the temple arm 122L may be hung over a shirt pocket (not shown) and the spectacles 10 then folded closed so as to pinch the shirt pocket between the temple arms 122L and 22R that are clasped in their respective substantially closed positions. The spectacles can be provided with the pivotable and translatable means in either or both temple arms 122L and 22R such that a wearer can accomplish storing the spectacles 10 on a storage surface no matter what sequence the left and right temple arms 122L and 22R are folded closed. Preferably, the temple arms 122L and 22R are made of the same material as the lens frame 12, but may be composed of a different material. The lens frame 12 and temple arms 22L and 22R are preferably made from plastic but may also be made from any other typical eyewear material such as metal, but the invention is not limited to only plastic or metal materials.

Individual components made by any acceptable manufacturing process known in the art of producing spectacles at any time. As is well known in the art, temple arms and lens frames can be injection molded from plastic, stamped from metal, bent from wire, machined from any material, etc. Extraordinary manufacturing techniques are not required to produce the present invention, and any manufacturing techniques are acceptable for producing the novel and unobvious structure of these embodiments of the present invention. As is also known in the art, the temples are preferably assembled to the lens frame and then the hinge pivot is installed to the shoulder of the lens frame to pivotably and translatably fasten the temple arms to the lens frame. Nonetheless, any assembly techniques may be used. Finally, the disclosure and teachings of U.S. Pat. No. 6,196,682 B1, owned by the inventors hereof, is incorporated by reference herein.

With each of the embodiments described above, it is possible to provide spectacles that have integral features that enable one or more temple arms to be pivoted to a closed position and biased against a lens frame such that the spectacles can be clipped to a storage surface for safe keeping. Spectacles can either be specially designed and made or existing spectacles can be modified to accomplish the clipping objective. Existing spectacles can be modified by machining or otherwise producing special aperture geometry in the pivot end of the temple arm, hinge member, or lens frame.

While the present invention has been described in terms of a limited number of embodiments, it is apparent that other forms could be adopted by one skilled in the art. In other words, the teachings of the present invention encompass any reasonable substitutions or equivalents of claim limitations. For example, the structure, materials, sizes, and shapes of the individual components could be modified, or substituted with other similar structure, materials, sizes, and shapes. Specific examples include various equivalent aperture geometries, and various equivalent lens frames and temple members. Accordingly, the present invention is not limited to only those exemplary embodiments herein. Accordingly, the scope of the present invention is to be limited only by the following claims.

What is claimed is:

1. Spectacles comprising:
   a lens frame;
   a temple arm attached to said lens frame; and
   means for pivotably and translatably mounting said temple arm to said lens frame, said temple arm and said lens frame being relatively pivotable with respect to one another, said temple arm and said lens frame being relatively translatable with respect to one another, wherein said temple arm and said lens frame translate with respect to each other into a locked position wherein at least a portion of said temple arm is biased toward said lens frame.

2. The spectacles as claimed in claim 1, wherein said means for pivotably and translatable mounting comprises a hinge pivot extending through at least a portion of said lens frame and through at least a portion of said temple arm.

3. The spectacles as claimed in claim 2, wherein said means for pivotably and translatably mounting further comprises a void in one of said lens frame and said temple member, said void having one end and an opposite end, said temple member and said lens frame being relatively pivotable with respect to one another about said hinge pivot when said hinge pivot is positioned substantially at said one end of said void, said temple member and said lens frame being relatively translatable with respect to one another along the longitudinal direction said void, said temple member and said lens frame occupying said locked position when said hinge pivot is positioned substantially at said opposite end of said void under a detent condition.

4. The spectacles as claimed in claim 3, wherein said hinge pivot is mounted to said lens frame and further wherein said temple member comprises said void.

5. Spectacles comprising
   a lens frame;
   a temple arm attached to said lens frame;
   an elongated void in at least one of said lens frame and said temple arm, said elongated void partially defined by a pivot end and a lock end oppositely disposed of said pivot end; and
   a hinge pivot in at least one of said lens frame and said one end of said temple arm, said temple arm and said lens frame being relatively pivotable with respect to one another about said hinge pivot between an substantially open position and a closed position inclusive when said hinge pivot is positioned substantially at said one end of said elongated void, said temple member and said lens frame being relatively translatable with respect to one another along the longitudinal direction said elongated void, said temple member and said lens frame being translatable with respect to one another into a locked position when said hinge pivot is positioned substantially at said opposite end of said elongated void.

6. The spectacles as claimed in claim 5, wherein a portion of said temple arm jams between a portion of said lens frame and said hinge pivot to establish said locked position.

7. The spectacles as claimed in claim 6, wherein said elongated void is partly defined by a projection of said temple arm, said projection providing a detent behind which said hinge pivot becomes trapped to establish said locked position.

8. The spectacles as claimed in claim 5, wherein said lock end of said elongated void is smaller than said pivot end of said elongated void so as to frictionally engage said hinge pivot in detent to establish said locked position.

9. The spectacles as claimed in claim 5, wherein a portion of said temple arm jams between said a portion of said lens frame and said hinge pivot, and further wherein said opposite end of said elongated void is smaller than said pivot end of said elongated void so as to frictionally engage said hinge pivot in detent to establish said locked position.

10. The spectacles as claimed in claim 5, wherein said temple arm further comprises an ear portion biased toward said lens frame when said temple arm and said lens frame occupy said locked position.

11. The spectacles as claimed in claim 10, wherein said ear portion of said temple arm is biased directly against said lens frame.

12. The spectacles as claim in claim 5, wherein said hinge pivot comprises a hinge pivot mounted into at least one of said temple arm and said lens frame.

13. The spectacles as claimed in claim 5, wherein said hinge pivot comprises a hinge pivot integrally formed into one of said temple arm and said lens frame.

14. The spectacles as claimed in claim 5, wherein said spectacles is effective for clipping an article between said temple member and said lens frame.

15. Spectacles comprising:

a lens frame having shoulder with a hinge pivot extending at least partially therethrough; and a temple arm having a pivot end mounted to said shoulder of said lens frame, said pivot end of said temple arm having a slot therein, said slot being defined by a pivot end and a lock end generally opposite said pivot end, said temple arm being pivotable between a substantially open position and a closed position inclusive when said pivot end of said slot is aligned with said hinge pivot, said temple arm and said lens frame being translatable with respect to one another when said temple arm is substantially in said closed position, wherein said hinge pivot is relatively translatable into said lock end of said slot such that said temple arm and said lens frame occupy a locked position with respect to one another.

16. The spectacles as claimed in claim 15, wherein a portion of said temple arm jams between a portion of said lens frame and said hinge pivot to establish said locked position.

17. The spectacles as claimed in claim 16, wherein said slot is arcuately shaped and is partly defined by a projection of said temple arm, said projection providing a detent behind which said hinge pivot becomes trapped to maintain said locked position.

18. The spectacles as claimed in claim 15, wherein said lock end of said slot is smaller than said pivot end of said slot so as to frictionally engage said hinge pivot in detent to establish said locked position.

19. The spectacles as claimed in claim 15, wherein said temple arm includes an ear portion, said ear portion being biased directly against said lens frame, whereby said spectacles is effective for clipping an article between said temple member and said lens frame.

* * * * *